United States Patent [19]

Boehm

[11] 4,106,216

[45] Aug. 15, 1978

[54] POSITIONING SYSTEM UTILIZING BINARY CODE

[76] Inventor: Edward A. Boehm, Apt. #1, 2361 Ecuadorian Way, Clearwater, Fla. 33515

[21] Appl. No.: 769,396

[22] Filed: Feb. 16, 1977

[51] Int. Cl.² ............................................. G09B 1/10
[52] U.S. Cl. .................................... 35/9 R; 35/30; 200/46
[58] Field of Search ........... 35/9 R, 9 D, 31 D, 31 G, 35/35 D, 35 H, 30; 200/46

[56] References Cited

U.S. PATENT DOCUMENTS

| | | | |
|---|---|---|---|
| 2,491,084 | 12/1949 | Bobo et al. | 35/31 D |
| 2,505,230 | 4/1950 | Composto | 35/35 D |
| 3,224,114 | 12/1965 | Swanson | 35/31 D |
| 3,305,945 | 2/1967 | Crawford et al. | 35/35 H |
| 3,314,165 | 4/1967 | Shreck et al. | 35/35 D X |
| 3,609,877 | 10/1971 | Weinstein | 35/9 R |
| 3,640,002 | 2/1972 | Braillard et al. | 35/35 H X |
| 3,696,533 | 10/1972 | Mortensen | 35/31 G X |
| 3,795,063 | 3/1974 | Nelson | 35/35 D |
| 3,805,416 | 4/1974 | Plefkey | 35/35 D |
| 3,811,206 | 5/1974 | Gaccetta | 35/35 H |
| 3,886,337 | 5/1975 | Haase | 200/46 |

Primary Examiner—William H. Grieb

[57] ABSTRACT

Positioning system for coupling one or more members to a base, which may be used, for example, in an educational device including a mounting board and plates with numbers or letters thereon to be coupled to the board in predetermined positions. The plates and the board have connecting portions arranged in a binary code so that each plate can be placed in only a desired position. The connecting portions can be a plurality of pins on each plate and openings in the board, which are coded to represent the digits of a binary code. Each portion can have one of two configurations which represent the binary "0" and "1" digits of the code. The portions can have the same cross sections, with portions representing "0" digits rotated with respect to portions representing "1" digit, or the "0" digit portions can be displaced with respect to the "1" digit portions.

8 Claims, 12 Drawing Figures

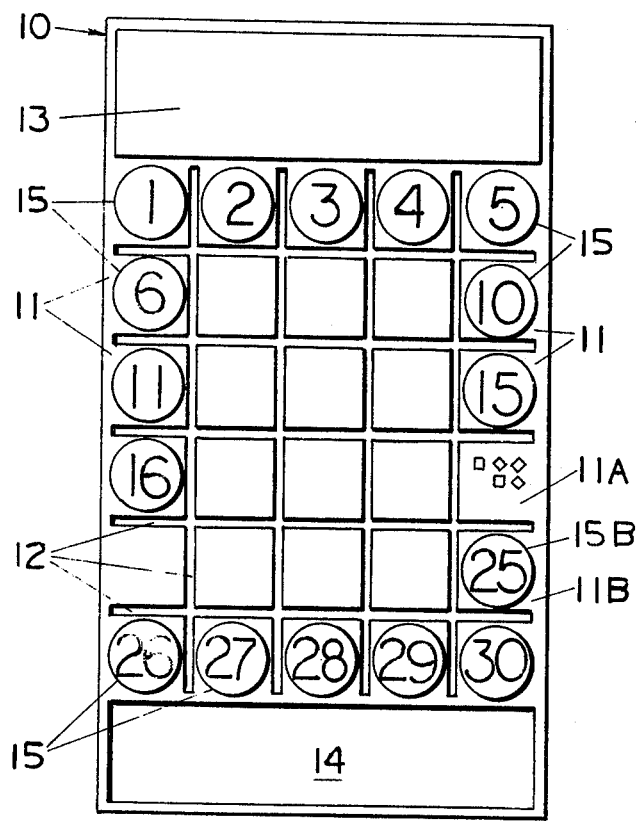
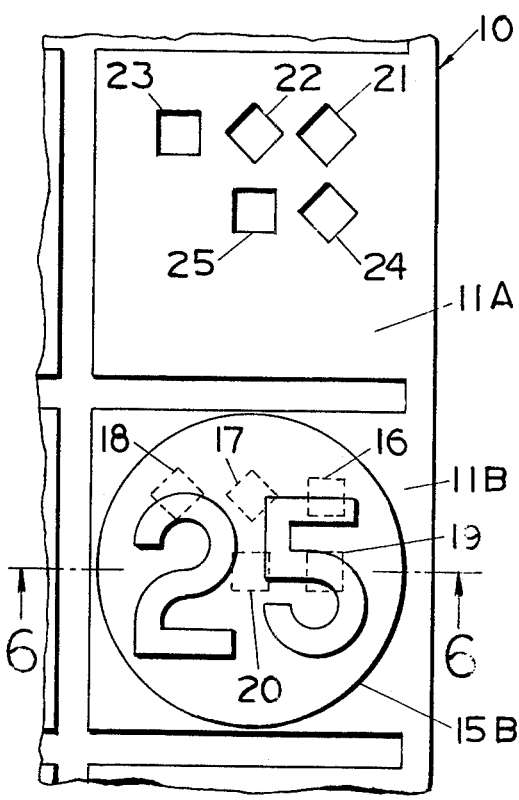
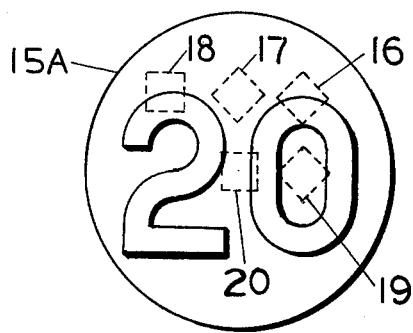
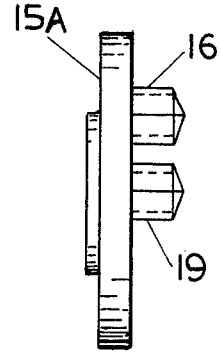
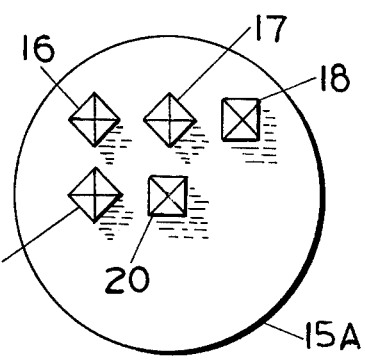
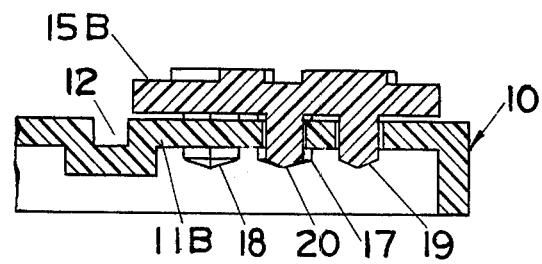

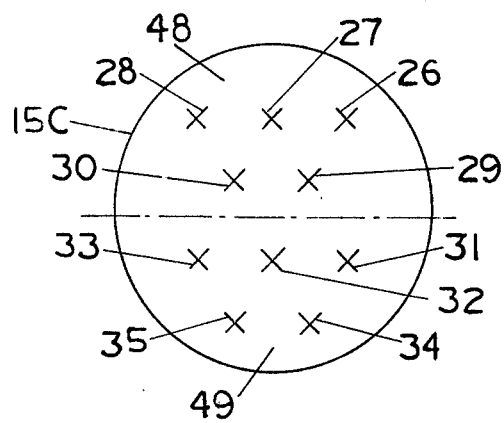
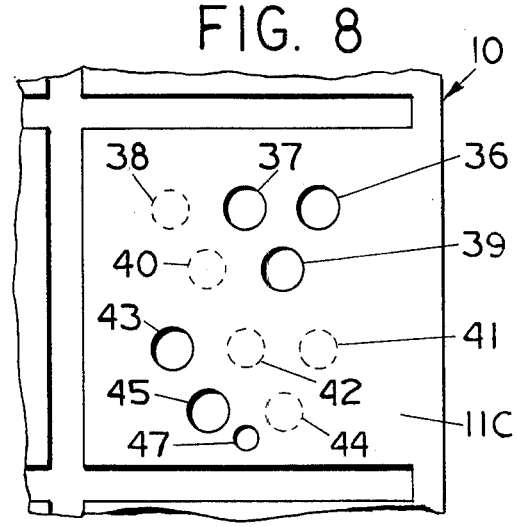
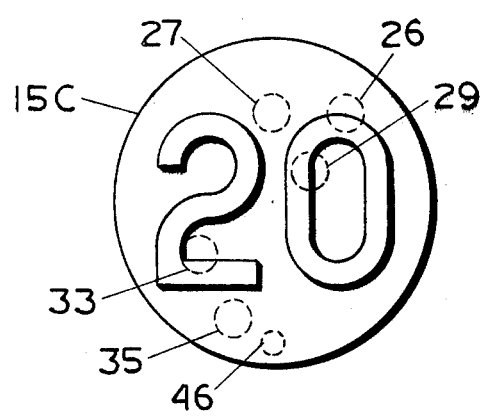
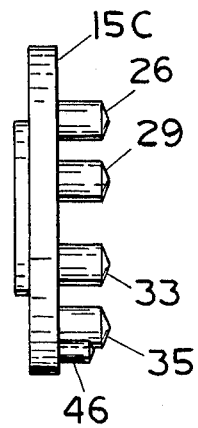
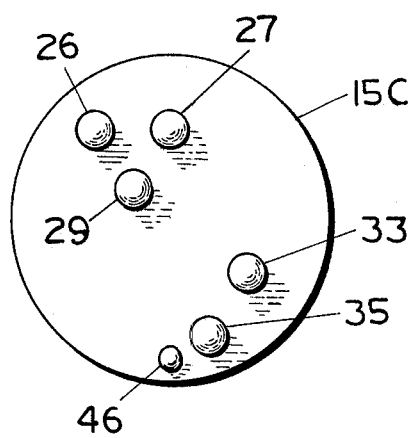
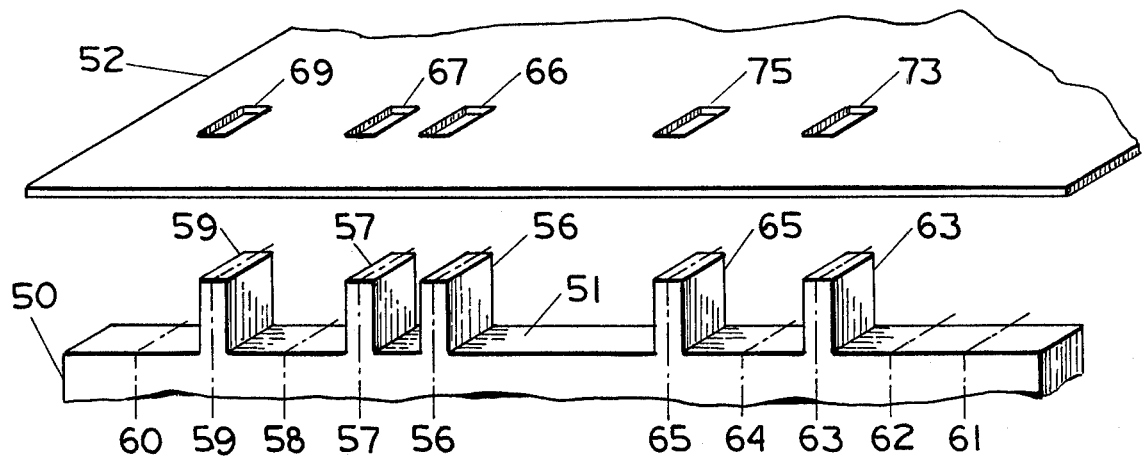

POSITIONING SYSTEM UTILIZING BINARY CODE

BACKGROUND OF THE INVENTION

There are many applications in which it is desired to position one or more members with respect to a base or other mounting structure, wherein the member or members can be positioned only in a predetermined way. For example, a device would be useful in teaching wherein plates or cards with letters or numbers thereon can be positioned on a mounting board only in predetermined positions to indicate a correct sequence of letters or numbers, as to spell a word. Although such devices have been proposed, they have been relatively complex and expensive to produce. Further, the known devices have not been easy for a young child to use.

Another application in which it is desired to mount a member with respect to a base or chassis is in electrical devices which use circuits provided on insulating boards wherein each board is to be positioned in a particular place. Various coding arrangements have been used, but have not been entirely satisfactory in identifying the various boards and the positions in which they are to be used.

SUMMARY OF THE INVENTION

It is an object of this invention to provide an improved positioning system wherein a member can be placed on a mounting base only in a desired position.

It is a further object of this invention to provide a positioning system wherein a member is coupled to a base by portions thereon which are arranged in accordance with a binary code.

Another object of the invention is to provide a system for connecting plates or cards to a mounting board including pins on the plates and openings in the board which are of two different configurations to represent the "0" and "1" digits of a binary code.

Still another object of the invention is to provide a system for connecting plates to a mounting board including a plurality of pins on the plates which have the same cross section, with pins representing a binary "1" being displaced angularly or laterally with respect to the binary "0" pins.

A still further object of the invention is to provide a system for positioning members on a base or chassis, with projections on one end of each member to be received into openings in the chassis wherein the projections are arranged in a binary code to identify the member and its position.

The positioning system of the invention includes a mounting board or base on which a plurality of members, such as plates or cards, can be detachably positioned. The members and the base each have a plurality of coupling portions which have two different configurations so that the portions can represent the digits or bits of a binary type code. Each portion has a fixed number of portions as required to form the number of digits in the code used, such as five digits. The portions can include pins or projections on the plate and openings in the base to receive the pins, or vice versa. The pins can all have a square cross section, for example, with the pins representing the binary "0" digits rotated 45° with respect to pins representing the binary "1" digits. In this case the "1" digit pins will have edges extending horizontal and vertical and the "0" digit pins will appear diamond shaped. Other different configurations for the pins and openings can be used to distinguish the "0" and "1" digits of the binary code. For example, the pins representing the "1" digits can be displaced with respect to the pins representing the "0" digits. The members can be plates on which letters or numbers are placed for use in an instructional device, or can be supports for electrical circuits to be positioned on a chassis.

The term "binary type code" is used in this specification and in the claims to mean any known form of binary code.

BRIEF DESCRIPTION OF THE DRAWINGS

FIG. 1 is a plan view of an educational device utilizing the positioning system of the invention;

FIG. 2 is an enlarged view of a portion of FIG. 1;

FIG. 3 is a front view of a plate for use in the device of FIG. 1;

FIGS. 4 and 5 are side and back views of the plate of FIG. 3;

FIG. 6 is a cross section view along the line 6—6 of FIG. 2;

FIGS. 7 to 11 illustrate a second embodiment of the invention; and

FIG. 12 shows a variation of the embodiment of FIGS. 7 to 11.

DETAIL DESCRIPTION

The educational device of FIG. 1 includes a mounting base or board 10 on which a plurality of members, such as number plates 15, are positioned. The device shown has a plurality of sections 11, each of which is adapted to receive a number plate 15. The sections are defined by horizontal and vertical grooves 12 (FIG. 6) which form six horizontal rows and five vertical columns providing 30 sections. The board 10 has a top space 13 for a title and a space 14 at the bottom which can be a recess used to store the number plates 15.

The mounting board 10 can be molded of plastic material for inexpensive construction. It will be obvious that raised ribs can be used instead of the grooves 12 to increase the strength of the board 10. The plates 15 can also be formed of plastic or other inexpensive material.

In the device shown in FIG. 1, the plates 15 have numbers thereon, and can be numbered 1 to 30 to be positioned on the 30 sections 11 of board 10. The plates can be used for letters, if desired, or any other indicia. Each plate 15 has five pins 16, 17, 18, 19 and 20 secured to the back thereof and each section 11 of the mounting board 10 has 5 openings 21, 22, 23, 24 and 25 therein for receiving the pins 16 to 20. This construction is fully illustrated in FIGS. 2 to 6. The pins have two different configurations to represent binary "0" digits and binary "1" digits of a five bit binary code which provides a separate code for each plate 15.

The binary code for the plates numbered 1 to 30 is set forth on Table A:

TABLE A

| ARABIC NUMBER | BINARY CODE PIN NO. | | | | | LETTER | ARABIC NUMBER | BINARY CODE PIN NO. | | | | | LETTER |
|---|---|---|---|---|---|---|---|---|---|---|---|---|---|
| | 20 | 19 | 18 | 17 | 16 | | | 20 | 19 | 18 | 17 | 16 | |
| 1 | 0 | 0 | 0 | 0 | 1 | A | 16 | 1 | 0 | 0 | 0 | 0 | P |

TABLE A-continued

| ARABIC NUMBER | BINARY CODE PIN NO. | | | | | LETTER | ARABIC NUMBER | BINARY CODE PIN NO. | | | | | LETTER |
|---|---|---|---|---|---|---|---|---|---|---|---|---|---|
| | 20 | 19 | 18 | 17 | 16 | | | 20 | 19 | 18 | 17 | 16 | |
| 2 | 0 | 0 | 0 | 1 | 0 | B | 17 | 1 | 0 | 0 | 0 | 1 | Q |
| 3 | 0 | 0 | 0 | 1 | 1 | C | 18 | 1 | 0 | 0 | 1 | 0 | R |
| 4 | 0 | 0 | 1 | 0 | 0 | D | 19 | 1 | 0 | 0 | 1 | 1 | S |
| 5 | 0 | 0 | 1 | 0 | 1 | E | 20 | 1 | 0 | 1 | 0 | 0 | T |
| 6 | 0 | 0 | 1 | 1 | 0 | F | 21 | 1 | 0 | 1 | 0 | 1 | U |
| 7 | 0 | 0 | 1 | 1 | 1 | G | 22 | 1 | 0 | 1 | 1 | 0 | V |
| 8 | 0 | 1 | 0 | 0 | 0 | H | 23 | 1 | 0 | 1 | 1 | 1 | W |
| 9 | 0 | 1 | 0 | 0 | 1 | I | 24 | 1 | 1 | 0 | 0 | 0 | X |
| 10 | 0 | 1 | 0 | 1 | 0 | J | 25 | 1 | 1 | 0 | 0 | 1 | Y |
| 11 | 0 | 1 | 0 | 1 | 1 | K | 26 | 1 | 1 | 0 | 1 | 0 | Z |
| 12 | 0 | 1 | 1 | 0 | 0 | L | 27 | 1 | 1 | 0 | 1 | 1 | |
| 13 | 0 | 1 | 1 | 0 | 1 | M | 28 | 1 | 1 | 1 | 0 | 0 | |
| 14 | 0 | 1 | 1 | 1 | 0 | N | 29 | 1 | 1 | 1 | 0 | 1 | |
| 15 | 0 | 1 | 1 | 1 | 1 | O | 30 | 1 | 1 | 1 | 1 | 0 | |

As stated above, the pins 16 to 20 are of two different configurations to represent the binary "0" and binary "1" digits or bits of the code. In the construction illustrated, the pins 16 to 20 are all of square cross section, with the edges of the pins representing "1" digits being horizontal and vertical, and the edges of the pins representing "0" digits being rotated by 45° to present a diamond shape.

FIGS. 3, 4 and 5 illustrate the plate 15A having the Arabic number 20 thereon. Pins 16, 17 and 19 are diamond shaped and represent "0" digits, and the pins 18 and 20 have horizontal edges and represent "1" digits. FIG. 2 illustrates the section 11A of the board 10 which is adapted to receive the plate 15A and illustrates the openings 21 to 25. The openings 21, 22 and 24 are diamond shaped to receive the pins 16, 17 and 19, and the openings 23 and 25 have horizontal edges to receive the pins 18 and 20. All the pins and openings have a non-circular cross section as is clearly shown in FIGS. 2 to 5.

FIG. 6 shows a cross section through the section 11B of the mounting board 10, and through plate 15B, which has the number 25 thereon. As shown by Table A, the pins 16 to 20 on plate 15B provide the binary code for Arabic number 25, with pins 16, 19 and 20 having horizontal edges, and pins 17 and 18 being diamond shaped. The openings 21 to 25 in the section 11B are shaped to receive the pins on plate 15B, with openings 21, 24 and 25 having horizontal edges and openings 22 and 23 being diamond shaped.

The configurations of the pins on all the plates 15 and the openings in all the sections is given by Table A. These are believed to be apparent from the above description of plates 15A and 15B and the sections 11A and 11B. Although the pins on the plates 15 in FIGS. 1 to 6 are all of square cross section, with the pins which represent "0" digits being rotated to appear diamond shaped, it will be obvious that pins of other configurations can be used. For example, the pins and openings for "1" digits can be square as illustrated in FIGS. 1 to 6, and the pins and openings for "0" digits can be round. Many other configurations can be used as long as the pins for the "1" digits and the pins for the "0" digits are different so that a pin for a "1" digit can not enter an opening for a "0" digit, and vice versa. Also, the pins or projections can be provided on the mounting board and the openings can be provided in the plates, if desired. Other coupling devices than pins and openings can also be used to provide the binary code.

FIGS. 7 to 11 illustrate another embodiment of the binary positioning system in accordance with the invention. In this arrangement, two separate sets of pins and holes are provided to represent the "0" and "1" digits. Each set of pins or holes is assigned a location or field on the number plate and the mounting board. The mounting board 10 and number plates 15 in FIGS. 7 to 11 may be the same as in FIGS. 1 to 6 except for the positions of the pins and holes, as will be explained.

FIG. 7 illustrates the two field locations on the number plate 15C, and the pin arrangements within the fields. Pins 26 to 30 are the pin locations for the "0" digits which are in field 48, and pins 31 to 35 are the pin locations for the "1" digits which are in field 49. Five binary digits are involved as in the embodiment previously described, and a combination of only five pins in the two fields are required. As in FIGS. 2 to 6, the plate 15C having the Arabic number "20" thereon is used in the illustration. The binary number for "20" is 10100, as shown on Table A. Therefore, three pins will appear in the "0" digit field 48 and two pins will appear in the "1" digit field 49. The three pins in the "0" digit field 48 are in locations 26, 27 and 29 in FIG. 7, and are further shown by FIGS. 9, 10 and 11. The two pins in the "1" digit field 49 are in locations 33 and 35. The number plate 15C will seat into a position on the mounting board 10 having hole locations in its section 11C as illustrated in FIG. 8. Pins 26, 27, 29, 33 and 35 will seat into holes 36, 37, 39, 43 and 45, respectively. The positions for the holes 38, 40, 41, 42 and 44, which are not used in section 11C, are shown dotted in FIG. 8 to give the locations of these holes in the mounting board 10 when they are required.

In Table B, the pin and hole locations for the number plates are shown for the "0" and "1" digit fields. This is the same binary numbering system shown on Table A. The binary code for only some of the number plates is given to simplify the table.

TABLE B

| ARABIC NUMBER | "0" DIGIT FIELD PIN POSITION | | | | | "1" DIGIT FIELD PIN POSITION | | | | |
|---|---|---|---|---|---|---|---|---|---|---|
| | 30 | 29 | 28 | 27 | 26 | 35 | 34 | 33 | 32 | 31 |
| 1 | 0 | 0 | 0 | 0 | | | | | | 1 |
| 2 | 0 | 0 | 0 | | 0 | | | | 1 | |
| 3 | 0 | 0 | 0 | | | | | | 1 | 1 |
| 4 | 0 | 0 | | 0 | 0 | | | 1 | | |
| 5 | 0 | 0 | | 0 | | | | 1 | | 1 |
| 19 | | 0 | 0 | | | 1 | | | 1 | 1 |

TABLE B-continued

| ARABIC NUMBER | "0" DIGIT FIELD PIN POSITION |  |  |  |  | "1" DIGIT FIELD PIN POSITION |  |  |  |  |
|---|---|---|---|---|---|---|---|---|---|---|
|  | 30 | 29 | 28 | 27 | 26 | 35 | 34 | 33 | 32 | 31 |
| 20 |  | 0 |  | 0 | 0 | 1 |  | 1 |  |  |
| 21 |  | 0 |  | 0 |  | 1 |  | 1 |  | 1 |
| 29 |  |  |  | 0 |  | 1 | 1 | 1 |  | 1 |
| 30 |  |  |  |  | 0 | 1 | 1 | 1 | 1 |  |

To facilitate positioning the number plates on the mounting board, a positioning or alignment pin 46 may be provided on the plate 15C (FIGS. 9, 10 and 11) which can be received in an opening 47 in the section 11C of the mounting board 10 (FIG. 8). This pin can have a different configuration than the code pins 25 to 35. The use of such a pin makes it possible to use code pins which have symmetrical locations without danger of improper positioning. Such a positioning or alignment pin can also be used in the embodiment of FIGS. 2 to 6.

FIG. 12 illustrates a variation of the positioning system of FIGS. 7 to 11. The member to be positioned is a card 50 having an edge 51 with projections or pins thereon. This card will plug into it's designated position on a mounting base or chassis 52. Conversely, the mounting board can be equipped with projections and the plug-in member provided with the holes. As in the previous illustrations, the plug-in card is coded for the Arabic numeral "20".

In FIG. 12 the "0" digit field is represented by numbers 56 to 60, which correspond to numbers 26 to 30, respectively, in FIG. 7 and Table B. The "1" digit field is represented by numbers 61 to 65 which correspond to numbers 31 to 35, respectively, in FIG. 7 and Table B. In FIG. 12, projections appear in positions 56, 57 and 59 for the "0" digits, and in positions 63 and 65 for the "1" digits. Projections 56, 57, 59, 63 and 65 in card 50 plug into openings 66, 67, 69, 73 and 75 respectively, in the base 52. The openings in the base will be positioned in accordance with the binary code on the card to be received. The number of projections provided in the "0" digit field and in the "1" digit field will total five to correspond to the five digits in the binary number.

The binary code positioning system of the invention is suitable for use in many different applications. The system illustrated in FIGS. 1 to 6 is particularly suitable for use in an instructional device. In addition to the use of numbers on the plates as illustrated, letters or other indicia can be used. The five digit code is sufficient to individually identify the 26 letters, as shown by Table A.

The system illustrated by FIG. 12 is particularly applicable to electrical devices having circuits provided on cards. The projections for mounting the cards can include conductors for making connections to circuits provided on the cards, and the binary numbers formed by the projections will identify the individual cards.

The system can be of simple and inexpensive construction as both the plates (or cards) and mounting board (or chassis) can be molded of plastic, or formed of other inexpensive material. It is obvious that less than five pins or projections can be used if a smaller number of different plates is required, or more pins can be used if a larger number of plates is required, in accordance with the digits of the binary type code.

I claim:

1. A positioning system utilizing a binary type code including in combination, a base having a plurality of first coupling portions each having one of a first configuration representing a binary "0" digit of the code and a second different configuration representing a binary "1" digit, and a member adapted to be coupled to said base and having a plurality of second coupling portions, each having one of a first configuration representing a binary "0" digit and a second different configuration representing a binary "1" digit, said second coupling portions which have said first configuration being shaped to couple only with one of said first coupling portions which have said first configuration, and said second coupling portions which have said second configuration being shaped to couple only with one of said first coupling portions which have said second configuration, said second coupling portions of said member representing a given binary number and mating with said first coupling portions of said base which represent the same binary number.

2. A positioning system in accordance with claim 1 wherein said portions of one of said base and said member are projections, and said portions of the other of said base and said member have openings therein for receiving said projections.

3. A positioning system in accordance with claim 2 wherein said projections all have the same non-circular cross section, with projections having a first rotary position to represent a binary "1" digit and a different rotary position to represent a binary "0" digit.

4. A positioning system in accordance with claim 1 wherein said base is a mounting board having a plurality of sections each having a fixed number of portions representing a binary number, and including a plurality of plate members each having the same fixed number of portions representing a binary number to mate with portions of one of said sections of said base.

5. A positioning system in accordance with claim 4 wherein each of said plate members has an indicia thereon, and said portions thereof form a code which permits each one of said plate members to be coupled only to a predetermined one of said sections.

6. A positioning system in accordance with claim 4 wherein said plate members have numbers thereon, and said portions thereof form codes which permit said plate members to be mounted on said board only in a predetermined manner.

7. A positioning system in accordance with claim 4 wherein said portions of said base have openings therein and said portions of said members have projections thereon adapted to be received in said openings.

8. A positioning system utilizing a binary type code including in combination, a mounting board having a plurality of sections each having a fixed number of coupling portions, each having one of a first configuration representing a binary "0" digit of the code and a second configuration representing a binary "1" digit, and a plurality of plate members adapted to be coupled to said mounting board and each having the same fixed number of coupling portions, each having one of a first configuration representing a binary "0" digit and a second configuration representing a binary "1" digit, said coupling portions of said mounting board having openings therein and said coupling portions of said plate members having projections thereon adapted to be received in said openings, said projections having a square cross section, with said projections representing a binary "0" digit being positioned at 45° with respect to said projections representing a binary "1" digit, said projections on said member representing a given binary number and mating with openings of said mounting board which represent the same binary number.

* * * * *